(12) United States Patent
Vacquerie et al.

(10) Patent No.: US 12,726,705 B2
(45) Date of Patent: Sep. 1, 2026

(54) DYNAMIC IMAGE DIMENSION ADJUSTMENT

(71) Applicant: GoPro, Inc., San Mateo, CA (US)

(72) Inventors: Vincent Vacquerie, Longnes (FR); Nicolas Rahmouni, Paris (FR)

(73) Assignee: GoPro, Inc., San Mateo, CA (US)

( * ) Notice: Subject to any disclaimer, the term of this patent is extended or adjusted under 35 U.S.C. 154(b) by 34 days.

(21) Appl. No.: 18/839,306

(22) PCT Filed: Dec. 2, 2022

(86) PCT No.: PCT/US2022/051683
§ 371 (c)(1),
(2) Date: Aug. 16, 2024

(87) PCT Pub. No.: WO2023/163781
PCT Pub. Date: Aug. 31, 2023

(65) Prior Publication Data

US 2025/0088744 A1 Mar. 13, 2025

Related U.S. Application Data

(60) Provisional application No. 63/312,951, filed on Feb. 23, 2022.

(51) Int. Cl.
*H04N 23/68* (2023.01)

(52) U.S. Cl.
CPC ..... *H04N 23/6842* (2023.01); *H04N 23/6812* (2023.01)

(58) Field of Classification Search
None
See application file for complete search history.

(56) References Cited

U.S. PATENT DOCUMENTS

| | | | | |
|---|---|---|---|---|
| 2013/0083202 | A1* | 4/2013 | Batur | H04N 23/68 348/169 |
| 2014/0028847 | A1* | 1/2014 | Wang | H04N 25/443 348/148 |
| 2015/0181123 | A1 | 6/2015 | Pacurariu | |
| 2016/0150158 | A1* | 5/2016 | Hasan | H04N 23/6842 348/208.2 |
| 2017/0034410 | A1 | 2/2017 | Yoo | |
| 2019/0028645 | A1 | 1/2019 | Satoh | |
| 2019/0199946 | A1* | 6/2019 | Wendel | H04N 25/441 |
| 2019/0364208 | A1* | 11/2019 | Park | G06V 20/46 |
| 2021/0014399 | A1 | 1/2021 | Yamazaki | |
| 2021/0112215 | A1* | 4/2021 | Kuo | H04N 25/78 |

OTHER PUBLICATIONS

International Search Report and Written Opinion issued in App. No. PCT/US2022/051683, mailing date Mar. 16, 2023, 15 pages.

* cited by examiner

*Primary Examiner* — Paul M Berardesca
(74) *Attorney, Agent, or Firm* — Young Basile Hanlon & MacFarlane, P.C.

(57) ABSTRACT

A computer accesses a feed of image frames from a camera. The computer determines, based on at least a first image frame from the feed, electronic image stabilization (EIS) data, and internal motion unit (IMU) data, a future image height. The computer enables or disables, for at least a second image frame from the feed, image lines on a sensor of the camera to obtain the determined future image height.

20 Claims, 9 Drawing Sheets

DEVICE
400

IMAGE SENSOR(S)
402

CAMERA CONTROLLER
404

FIG. 4

DYNAMIC IMAGE DIMENSION ADJUSTMENT

CROSS-REFERENCE TO RELATED APPLICATIONS

This application is a 371 of International Application No. PCT/US2022/051683 filed on Dec. 2, 2022, which claims the priority to U.S. Provisional Application No. 63/312,951, filed on Feb. 23, 2022, the entire disclosures of which are hereby incorporated by reference.

TECHNICAL FIELD

This disclosure relates to an image capture device that captures images and a method and apparatus for adjusting dimensions of the images.

BACKGROUND

Generally, image capture devices are available that are capable of capturing both images and videos. When a feed of images, for example in a video, is captured while the image capture device is moving, image stabilization may be challenging.

SUMMARY

The present teachings provide a method that includes accessing a feed of image frames from a camera; determining, based on at least a first image frame from the feed, a future image height based on electronic image stabilization (EIS) data and internal motion unit (IMU) data; and enabling or disabling, for at least a second image frame from the feed, image lines on a sensor of the camera to obtain the determined future image height.

In some examples of the method, enabling or disabling the image lines on the sensor of the camera comprises: disabling h uppermost image lines of the camera sensor; disabling h lowermost image lines of the camera sensor; and enabling remaining image lines of the camera sensor, wherein h is a positive integer determined based on the future image height and a total number of image lines of the camera sensor.

In some examples, the method includes, recursively repeating accessing the feed, determining the future image height, and enabling or disabling the image lines on the sensor.

In some examples of the method, the IMU data comprises angular motion data from a gyroscope.

In some examples of the method, the EIS data comprises at least one of: rotation data, panning data, or tilting data.

In some examples of the method, enabling the image lines on the sensor comprises providing electric power to the image lines on the sensor.

In some examples of the method, disabling the image lines on the sensor comprises failing to provide electric power to the image lines on the sensor.

The present teachings provide an apparatus that includes a camera comprising a sensor, the sensor comprising image lines; processing circuitry; and a memory storing instructions which, when executed by the processing circuitry, cause the processing circuitry to: access a feed of image frames from the camera; determine, based on at least a first image frame from the feed, a future image height based on electronic image stabilization (EIS) data and internal motion unit (IMU) data; and enable or disable, for at least a second image frame from the feed, at least one of the image lines on the sensor of the camera to obtain the determined future image height.

In some examples of the apparatus, enabling or disabling the image lines on the sensor of the camera comprises: disabling h uppermost image lines of the camera sensor; disabling h lowermost image lines of the camera sensor; and enabling remaining image lines of the camera sensor, wherein h is a positive integer determined based on the future image height and a total number of image lines of the camera sensor.

In some examples, the memory stores instructions which, when executed by the processing circuitry, cause the processing circuitry to recursively repeat accessing the feed, determining the future image height, and enabling or disabling the image lines on the sensor.

In some examples of the apparatus, the IMU data comprises angular motion data from a gyroscope.

In some examples of the apparatus, the EIS data comprises at least one of: rotation data, panning data, or tilting data.

In some examples of the apparatus, enabling the image lines on the sensor comprises providing electric power to the image lines on the sensor.

In some examples of the apparatus, disabling the image lines on the sensor comprises failing to provide electric power to the image lines on the sensor.

The present teachings provide a machine-readable medium that stores instructions that, when executed by processing circuitry, cause the processing circuitry to: access a feed of image frames from a camera; determine, based on at least a first image frame from the feed, a future image height based on electronic image stabilization (EIS) data and internal motion unit (IMU) data; and enable or disable, for at least a second image frame from the feed, image lines on a sensor of the camera to obtain the determined future image height.

In some examples of the machine-readable medium, enabling or disabling the image lines on the sensor of the camera comprises: disabling h uppermost image lines of the camera sensor; disabling h lowermost image lines of the camera sensor; and enabling remaining image lines of the camera sensor, wherein h is a positive integer determined based on the future image height and a total number of image lines of the camera sensor.

In some examples, the machine-readable medium stores instructions which, when executed by the processing circuitry, cause the processing circuitry to recursively repeat accessing the feed, determining the future image height, and enabling or disabling the image lines on the sensor.

In some examples of the machine-readable medium, the IMU data comprises angular motion data from a gyroscope.

In some examples of the machine-readable medium, the EIS data comprises at least one of: rotation data, panning data, or tilting data.

In some examples of the machine-readable medium, enabling the image lines on the sensor comprises providing electric power to the image lines on the sensor.

In some examples of the machine-readable medium, disabling the image lines on the sensor comprises failing to provide electric power to the image lines on the sensor.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 is a block diagram of a device for dynamic image dimension adjustment.

DETAILED DESCRIPTION

The present teachings provide an image capture device that captures images or videos. The image capture device accesses a feed of image frames from a camera. The image capture device determines, based on at least a first image frame from the feed, a future image height based on electronic image stabilization (EIS) data (e.g., rotation data, panning data, or tilting data) and internal motion unit (IMU) data (e.g., gyroscope data). The image capture device enables or disables, for at least a second image frame from the feed, image lines on a sensor of the camera to obtain the determined future image height.

Figure 1A:
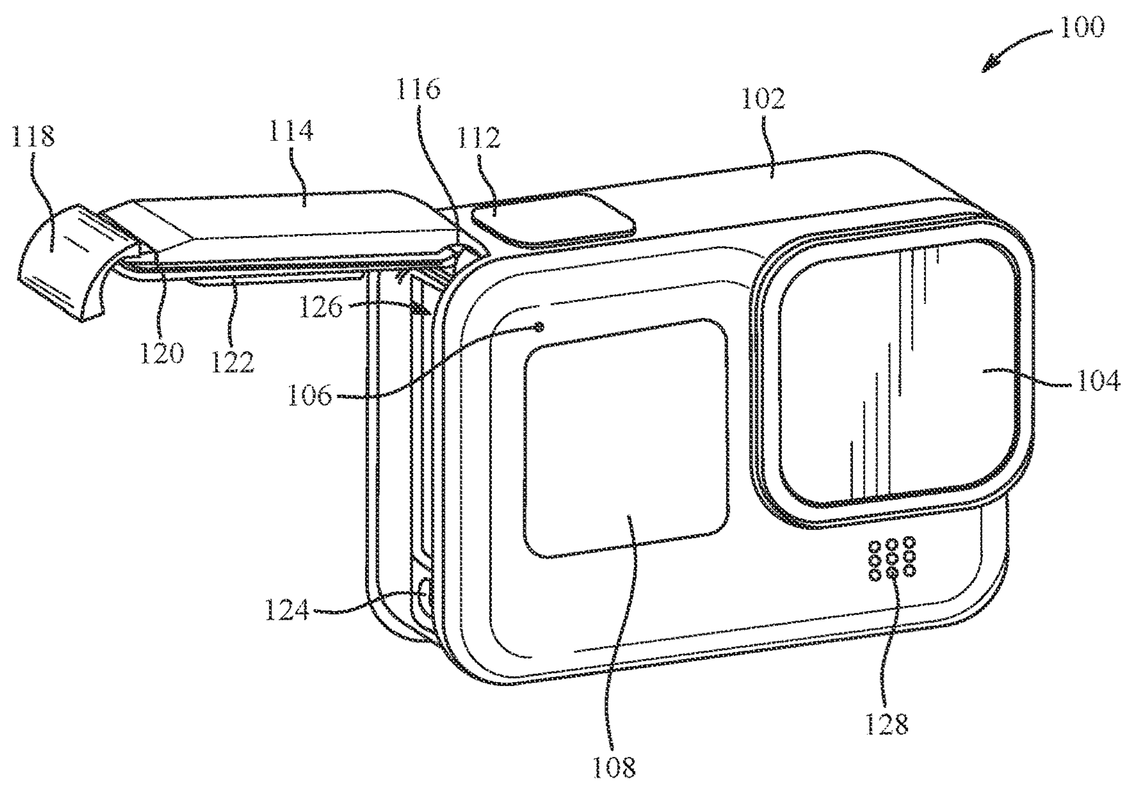
FIGS. 1A-B are isometric views of an example of an image capture device.
Figure 1B:
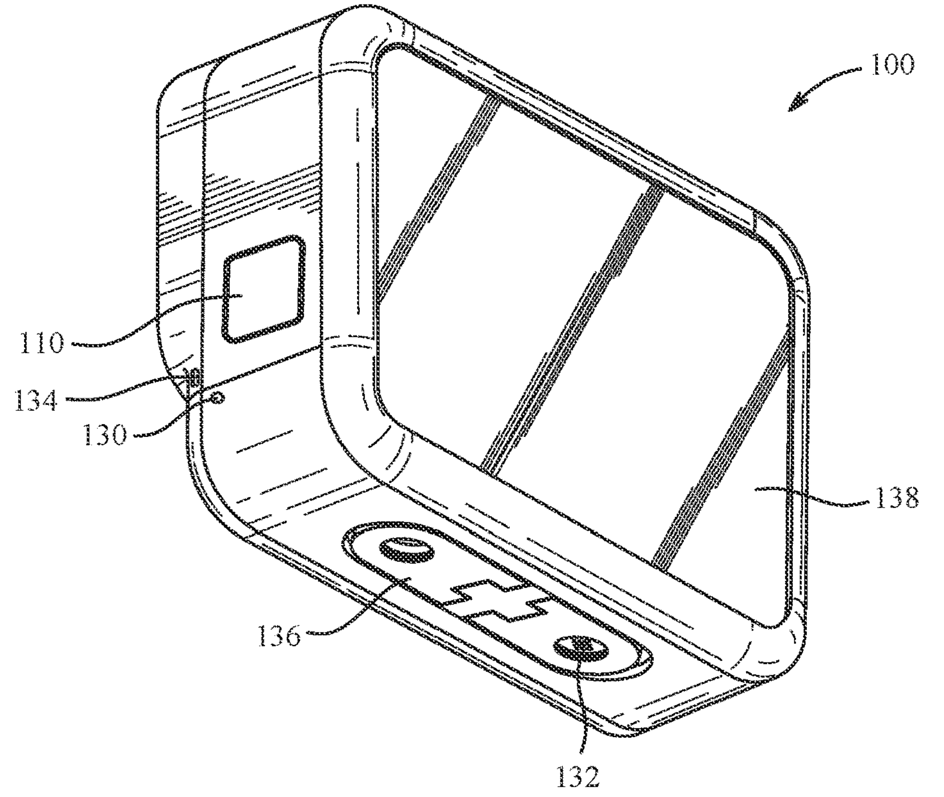

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxidesemiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

The image capture device 100 may be used to implement some or all of the techniques described in this disclosure, such as the technique of sound removal shown and described in FIGS. 4-8.

Figure 2A:
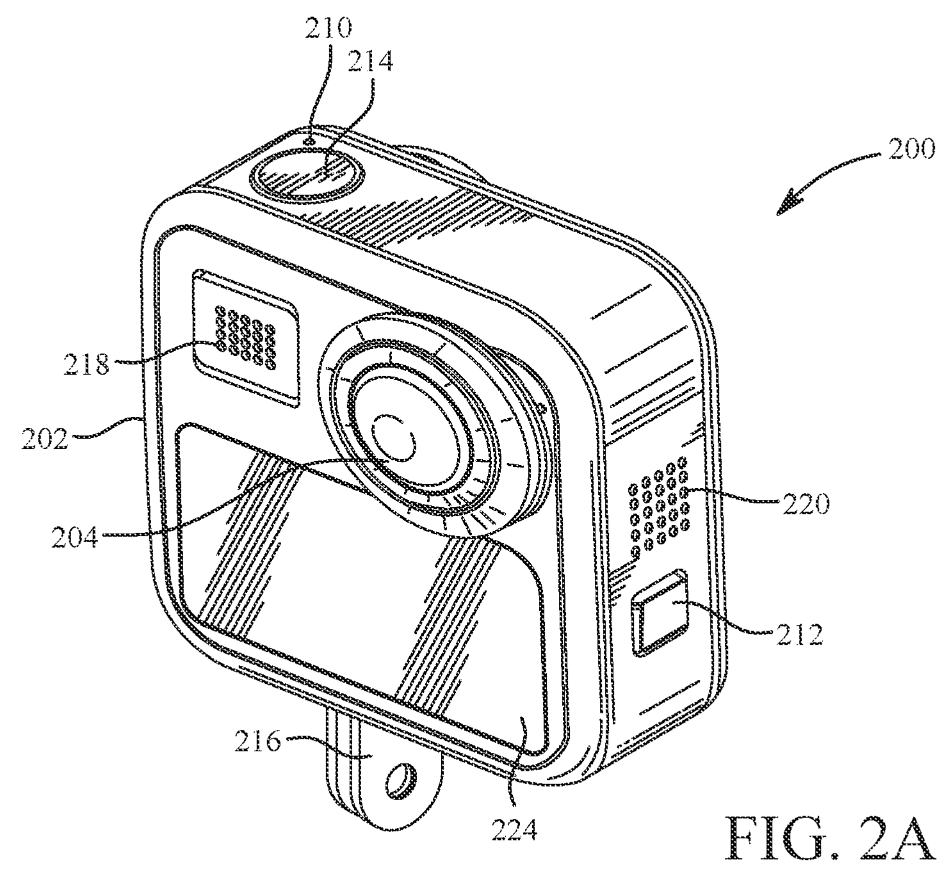
FIGS. 2A-B are isometric views of another example of an image capture device.
Figure 2B:
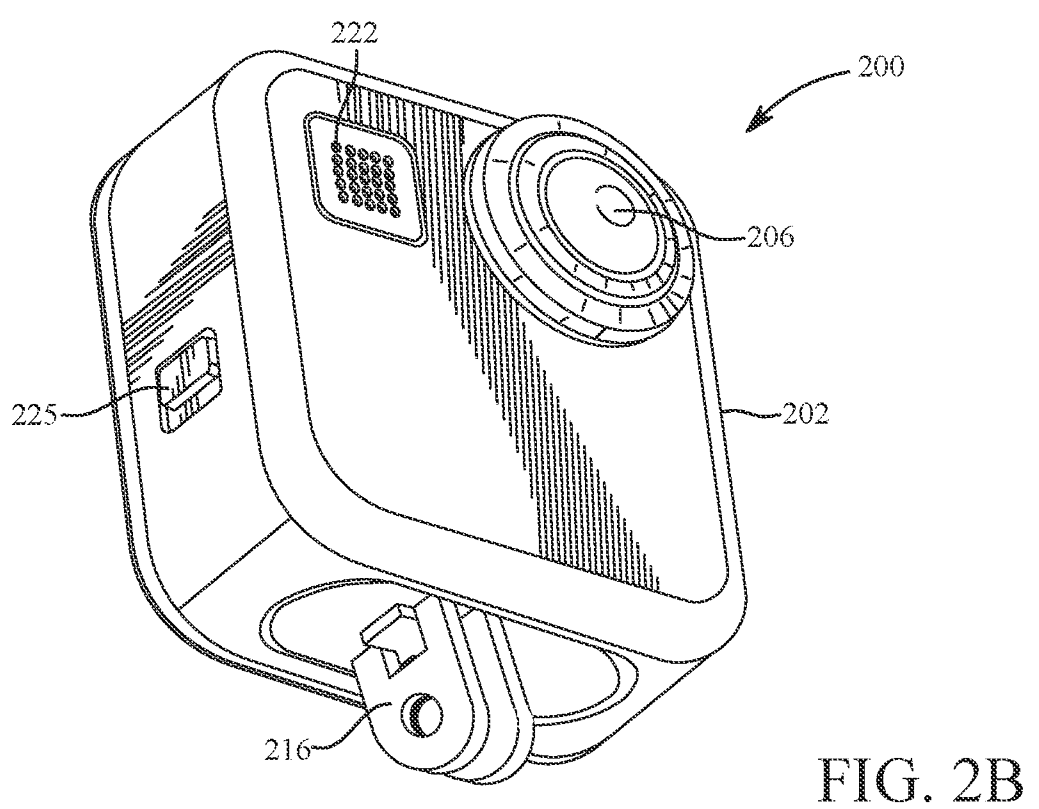
Figure 2C:
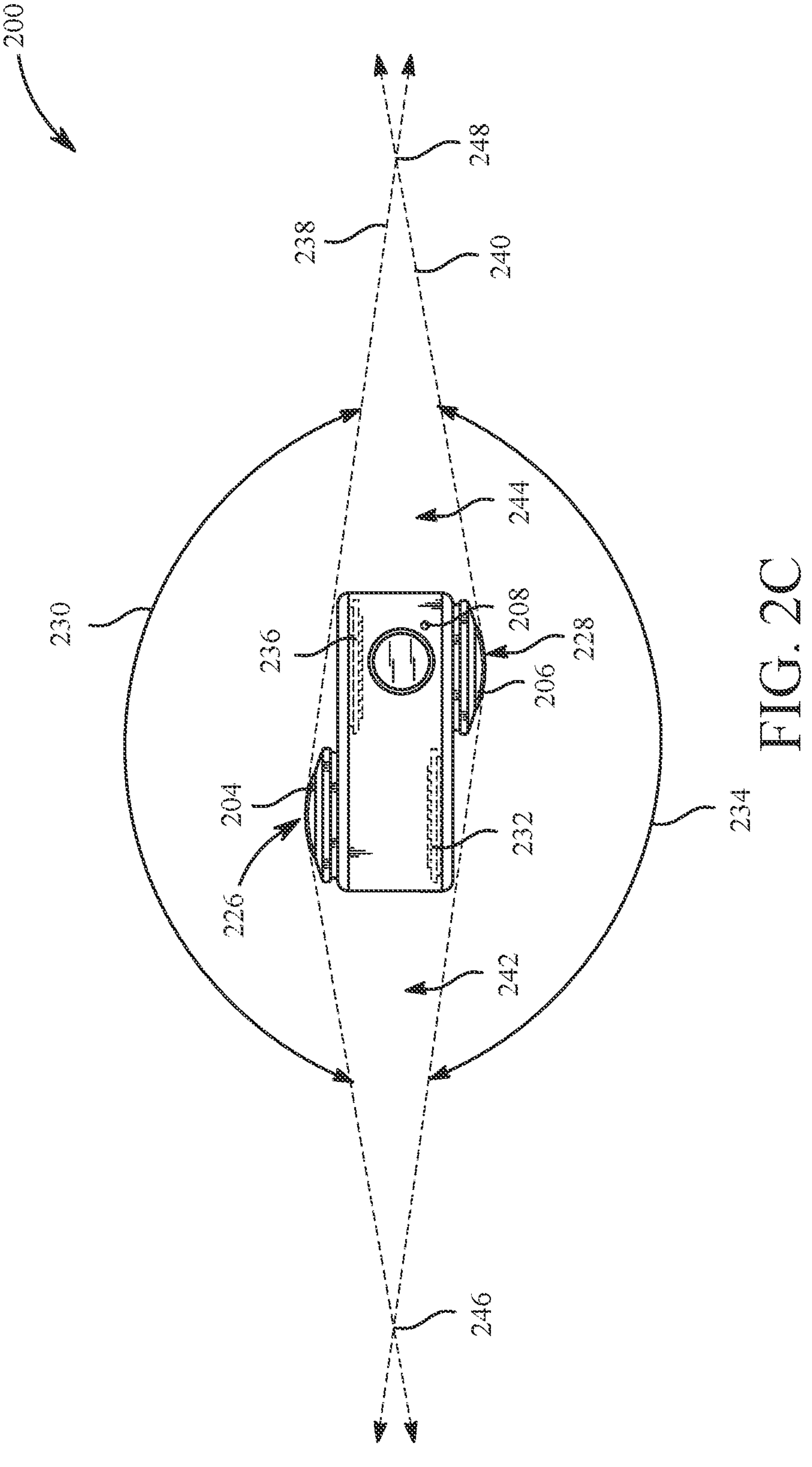
FIG. 2C is a top view of the image capture device of FIGS. 2A-B.
Figure 2D:
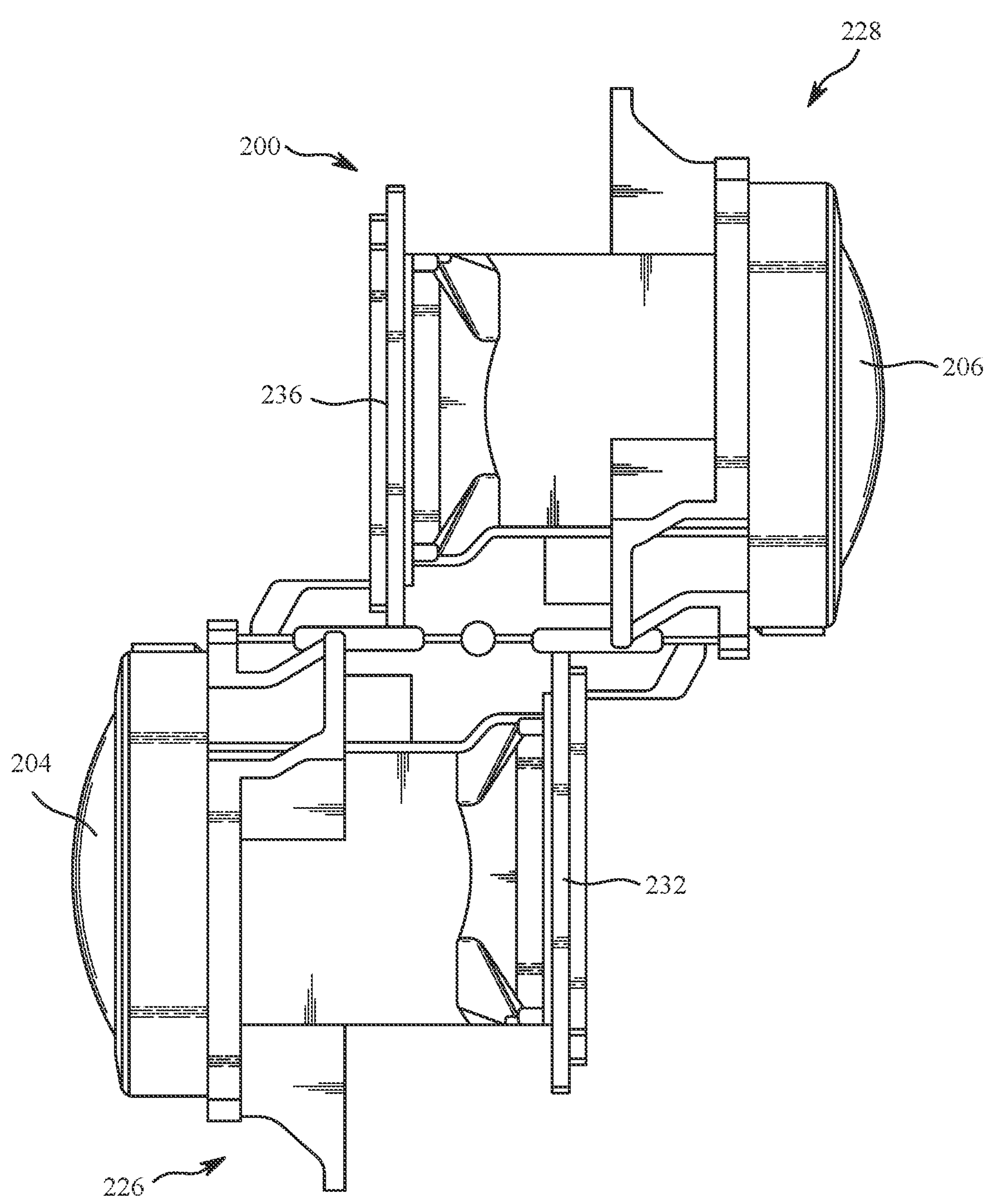
FIG. 2D is a partial cross-sectional view of the image capture device of FIG. 2C.

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 3:
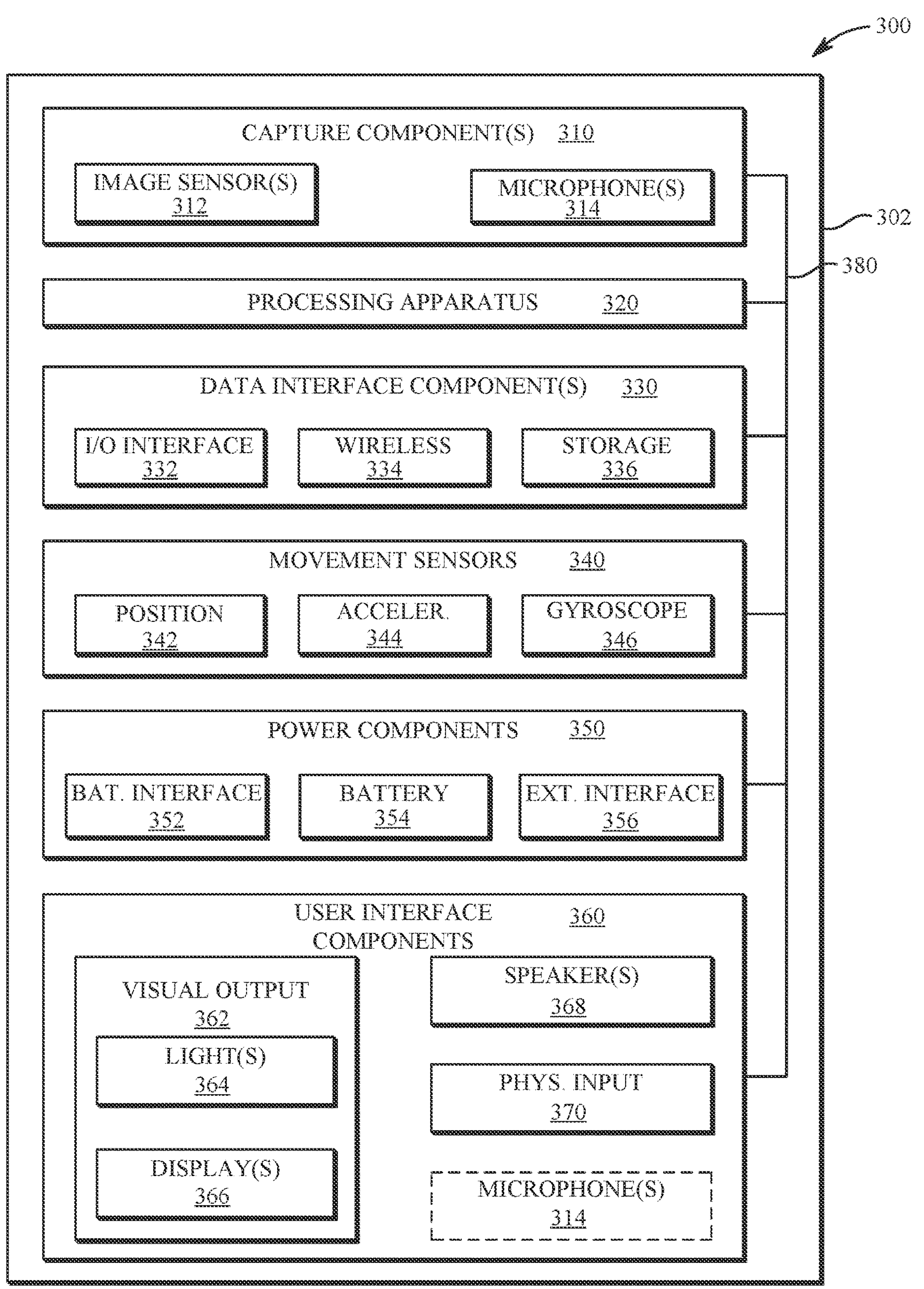
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the techniques described in this disclosure, such as the techniques described in FIGS. 4-8.

Figure 4:
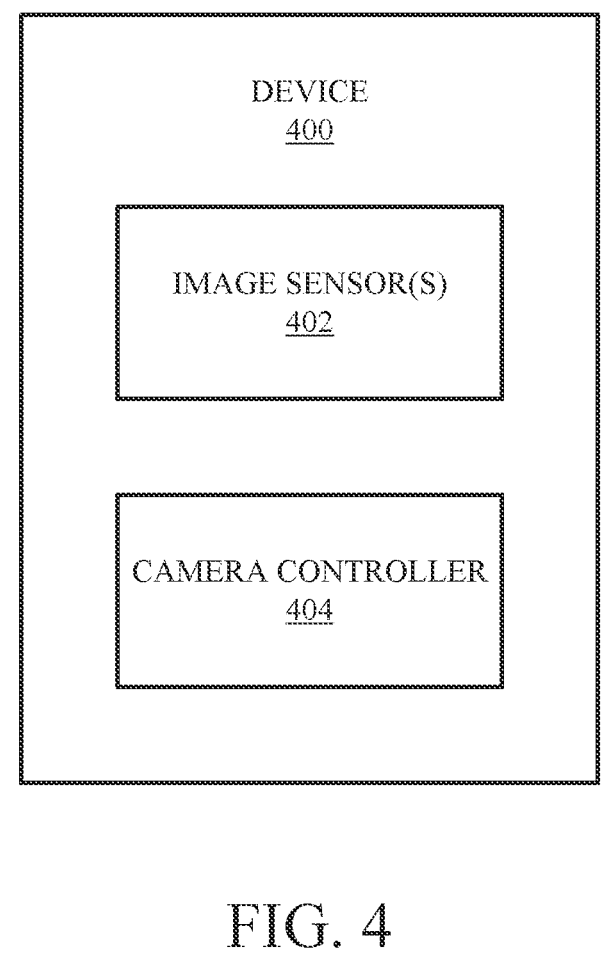

FIG. 4 is a block diagram of a device 400 for dynamic image dimension adjustment. The device 400 may correspond to the image capture device 100, 200, or 300. As shown, the device 400 includes image sensor(s) 402 and a camera controller 404. The image sensor(s) 402 may correspond to the image sensor(s) 312. The image sensor(s) 402 may be arranged in horizontal (or, alternatively, vertical) image lines, which may be enabled or disabled using the camera controller 404. The camera controller 404 may include software stored in the storage 336, which is executed by the processing apparatus 320. Alternatively, the camera controller 404 may be implemented in hardware by hardwiring the processing apparatus 320. In some cases, the camera controller is implemented in a combination of software that is stored in the storage 336 and hardware that is hard-wired in the processing apparatus 320. The camera controller 404 accesses a feed of image frames from a camera, which includes the image sensor(s) 402. The camera controller 404 determines, based on at least a first image frame from the feed, a future image height based on EIS and IMU data, which may be obtained via the movement sensors 340. The camera controller 404 enables or disables, for at least a second image frame from the feed, image lines (of the image sensor(s) 402) to obtain the determined future image height. More details of example operations of the image sensor(s) 402 and the camera controller 404 are provided in conjunction with FIG. 5.

Figure 5:
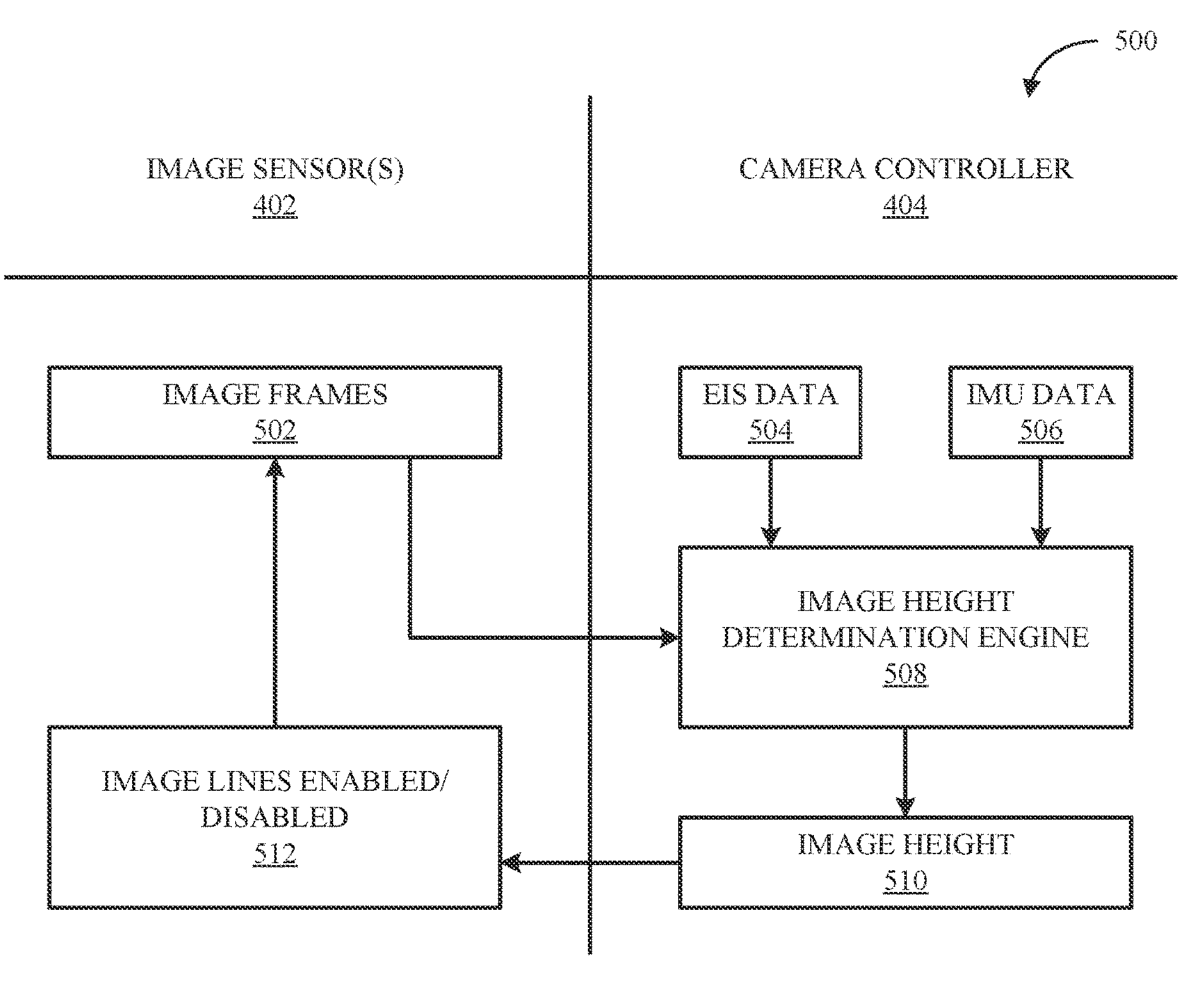
FIG. 5 is a data flow diagram of dynamic image dimension adjustment.

FIG. 5 is a data flow diagram of dynamic image dimension adjustment 500. As shown, the dynamic image dimension adjustment is implemented by the image sensor(s) and the camera controller 404. In some implementations, other components of the image capture device, such as at least one of the capture components 310, the processing apparatus 320, the data interface component(s) 330, the movement sensors 340, the power components 350, or the user interface components 360 may also be involved. Furthermore, the dynamic image dimension adjustment 500 is described herein as adjusting the height dimension. In some implementation, the width dimension (or other dimensions in images or videos with three or more dimensions) may be adjusted in addition to or in place of the height dimension.

As shown in FIG. 5, image sensor(s) 402 generate a feed (e.g., a stream) of image frames 502. The image frames 502 are provided to the camera controller 404. The camera controller 404 receives EIS data 504 and IMU data 506. The IMU data 506 may include any movement data, such as position sensor 342, accelerometer 344, and/or gyroscope 346 data from the movement sensors 340. In some examples, the IMU data 506 includes angular motion data from the gyroscope 346. The EIS data 504 may include rotation data, panning data, and/or tilting data, which may be obtained, for example, from the movement sensors 340.

As illustrated, the image frames 502, the EIS data 504, the IMU data 506 are provided as input to an image height determination engine 508 at the camera controller 404. The image height determination engine 508 determines an image height 510 for future image(s) from the image sensor(s) 402. In some implementations, the image height 510 may be determined using any optimization technique to increase stability and reduce shakiness of image frames 502 in the feed from the image sensor(s). For example, the image height 510 may be determined to ensure a constant viewing angle (e.g., relative to horizontal, vertical, or another fixed line) from a lens of the camera (e.g., from 20 degrees downward from horizontal to 30 degrees upward from horizontal).

The determined image height 510 is provided to the image sensor(s) 402. At the image sensor(s) 402, image lines are enabled or disabled 512 based on the image height, and future image frames 502 are adjusted accordingly. The image lines may be enabled or disabled 512 by providing (to enable) electric power to some image lines on the image sensor(s) 402 and failing to provide (to disable) electric power to other image lines on the image sensor(s) 402.

Figure 6:
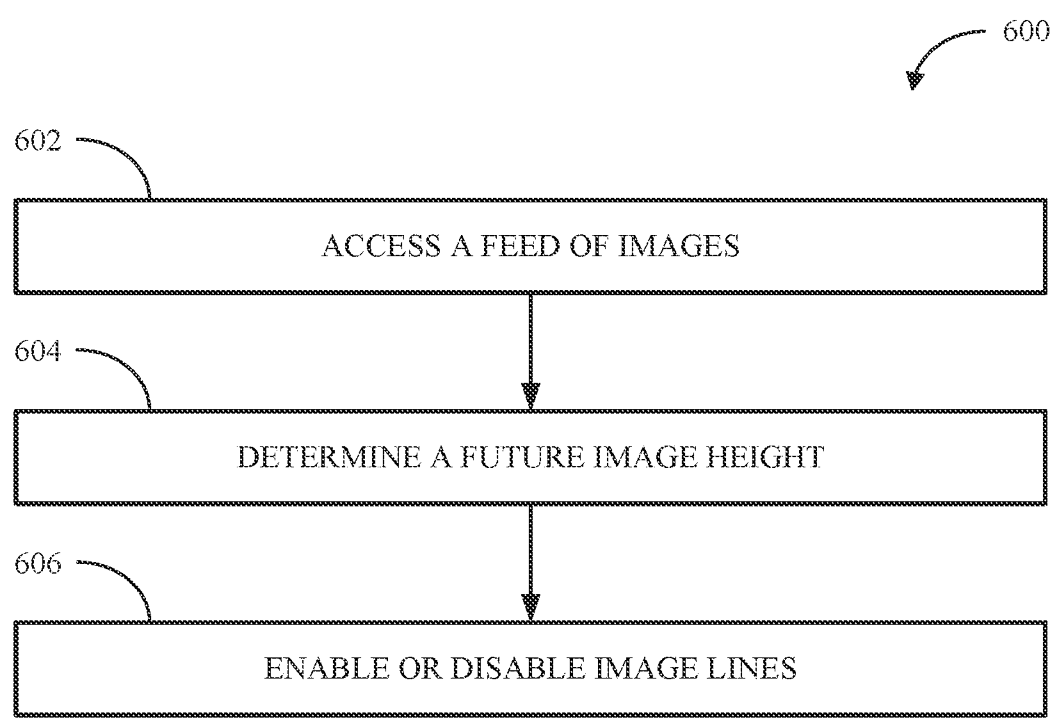
FIG. 6 is a flow chart of a method of dynamic image dimension adjustment.

FIG. 6 is a flow chart of a method 600 of dynamic image dimension adjustment. The method 600 may be performed by a device, for example, the device 400 or the image capture device 100, 200, or 300. Alternatively, the device implementing the method 600 may be any computing device including processing hardware and memory.

At block 602, the device accesses a feed of image frames from a camera. The feed may be a stream of images, for example, in a video or live photo. The camera may be stationery (e.g., fixed on a tripod) or may be moving (e.g., carried in a hand of a person who is walking or moving the hand). The camera may be physically attached to the device. Alternatively, the device may communicate with the camera over a network (e.g., the Internet, a cellular network, or a Wi-Fi® network) or over a direct wired or wireless (e.g., Bluetooth®) connection.

At block 604, the device determines, based on at least a first image frame from the feed, EIS data, and IMU data, a future image height. The EIS data and/or the IMU data may be generated based on data from the movement sensor 340. The EIS data may include rotation data, panning data, and/or tilting data. The IMU data may include angular motion data from the gyroscope 346. The IMU data may include data from the position sensor 342 or the accelerometer 344.

At block 606, the device enables or disables, for at least a second image frame from the feed, image lines on a sensor from the camera to obtain the determined future image height. The second image frame may occur later (in time) than the first image frame. Enabling the image lines on the sensor may include providing electric power to the image lines on the sensor. Disabling the image lines on the sensor may include failing to provide electric power to the image lines on the sensor. According to some examples, (e.g., as described in conjunction with FIG. 7) the device disables the h uppermost image lines of the camera sensor and the h lowermost image lines of the camera sensor, where h is a positive integer. The device enables the remaining (middle) lines of the camera sensor. The value of n may be determined based on the future image height and a total number of image lines on the camera sensor. For example, if the total number of image lines on the camera sensor is M, and the future image height is m image lines, then $h=(M-m)/2$. Alternatively, (e.g., as described in conjunction with FIG. 8) the device may disable the h1 uppermost image lines of the camera sensor and the h2 lowermost image lines of the camera sensor, where h1 and h2 are different positive integers.

As described above, the blocks 602, 604, and 606 are performed a single time. Alternatively, these blocks may be recursively repeated resulting in regular adjustment of the enabled and disabled image lines based on image frame(s), EIS data, and IMU data. The recursive repetition of the blocks 602, 604, and 606 may stop based on disabling, by the user, of image stabilization and/or based on a termination of receipt of the feed of image frames.

Figures 7, 8:
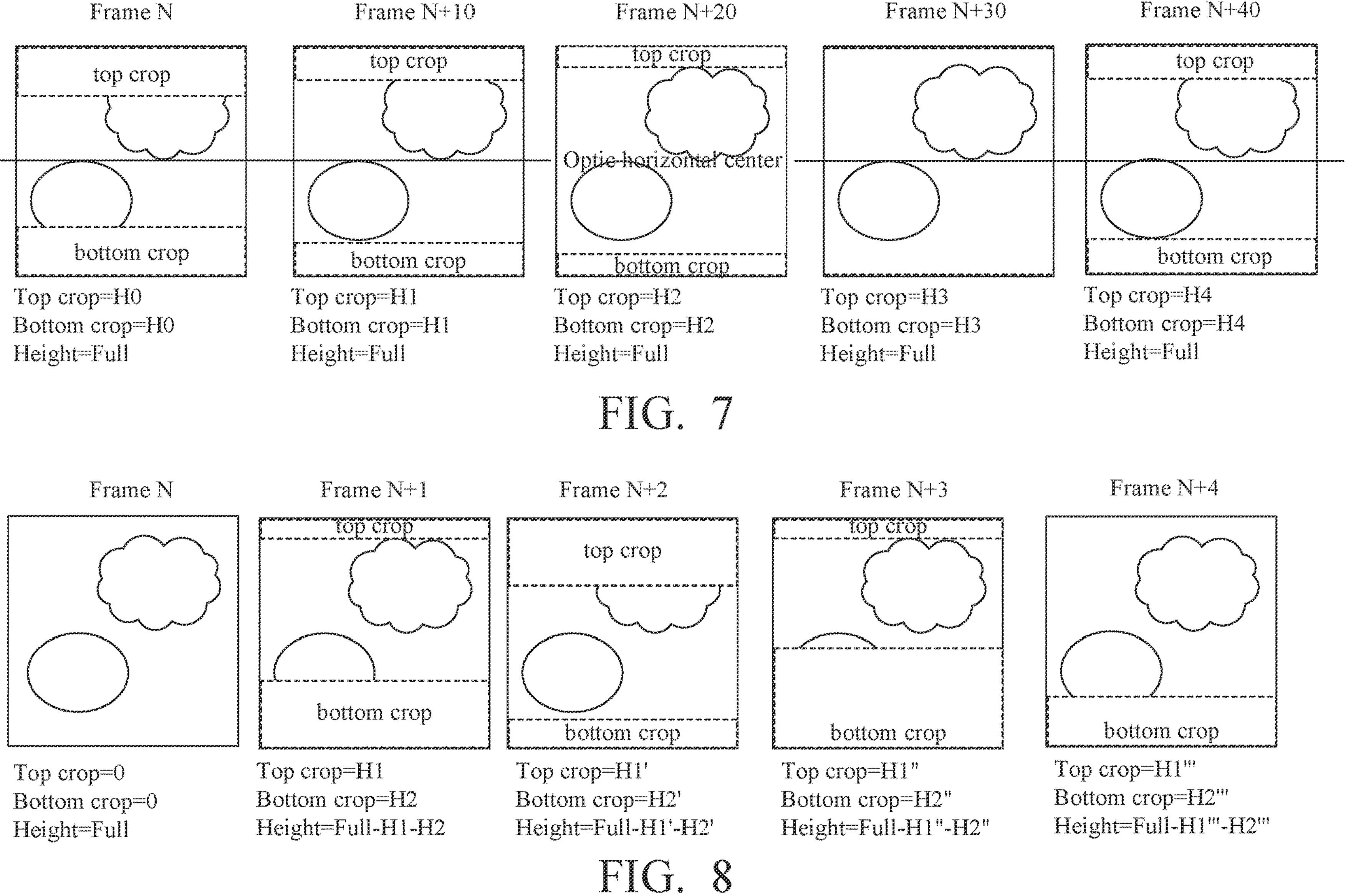
FIG. 7 illustrates dynamic image height adjustment.
FIG. 8 illustrates dynamic image cropping.

FIG. 7 illustrates dynamic image height adjustment. As shown in FIG. 7, Frame N has a top crop of H0 and a bottom crop of H0. Frame N+10 has a top crop of H1 and a bottom crop of H1. Frame N+20 has a top crop of H2 and a bottom crop of H2. Frame N+30 has a top crop of H3 and a bottom crop of H3. Frame N+40 has a top crop of H4 and a bottom crop of H4. In all of the illustrated frames, the optic horizontal center is the same (e.g., matches), and the top crop is equal to the bottom crop.

FIG. 8 illustrates dynamic image cropping. As shown in FIG. 8, Frame N has a top crop of 0, a bottom crop of 0, and a height of Full. Frame N+1 has a top crop of H1, a bottom crop of H2, and a height of Full−H1−H2. Frame N+2 has a top crop of H1', a bottom crop of H2', and a height of Full−H1'−H2'. Frame N+3 has a top crop of H1'', a bottom crop of H2'', and a height of Full−H1''−H2''. Frame N+4 has a top crop of H1''', a bottom crop of H2''', and a height of Full−H1'''−H2'''. As illustrated, each frame can support a top crop and a bottom crop. Each frame has independent crop values. Each frame has an independent height. No frames are corrupted when changing either the top crop or the bottom crop (all frames are valid frames). In FIG. 8, the top and bottom crop values are independent of one another.

Some implementations are described below as numbered examples (Example 1, 2, 3, etc.). These examples are provided as examples only and do not limit the other implementations disclosed herein.

Example 1 is a method comprising: accessing a feed of image frames from a camera; determining, based on at least a first image frame from the feed, a future image height based on electronic image stabilization (EIS) data and internal motion unit (IMU) data; and enabling or disabling, for at least a second image frame from the feed, image lines on a sensor of the camera to obtain the determined future image height.

In Example 2, the subject matter of Example 1 includes, wherein enabling or disabling the image lines on the sensor of the camera comprises: disabling h uppermost image lines of the camera sensor; disabling h lowermost image lines of the camera sensor; and enabling remaining image lines of the camera sensor, wherein h is a positive integer determined based on the future image height and a total number of image lines of the camera sensor.

In Example 3, the subject matter of Examples 1-2 includes, recursively repeating accessing the feed, determining the future image height, and enabling or disabling the image lines on the sensor.

In Example 4, the subject matter of Examples 1-3 includes, wherein the IMU data comprises angular motion data from a gyroscope.

In Example 5, the subject matter of Examples 1-4 includes, wherein the EIS data comprises at least one of: rotation data, panning data, or tilting data.

In Example 6, the subject matter of Examples 1-5 includes, wherein enabling the image lines on the sensor comprises providing electric power to the image lines on the sensor.

In Example 7, the subject matter of Examples 1-6 includes, wherein disabling the image lines on the sensor comprises failing to provide electric power to the image lines on the sensor.

Example 8 is an apparatus comprising: a camera comprising a sensor, the sensor comprising image lines; processing circuitry; and a memory storing instructions which, when executed by the processing circuitry, cause the processing circuitry to: access a feed of image frames from the camera; determine, based on at least a first image frame from the feed, a future image height based on electronic image stabilization (EIS) data and internal motion unit (IMU) data; and enable or disable, for at least a second image frame from the feed, at least one of the image lines on the sensor of the camera to obtain the determined future image height.

In Example 9, the subject matter of Example 8 includes, wherein the instructions which, when executed by the processing circuitry, cause the processing circuitry to enable or disable the at least one of the image lines on the sensor of the camera comprise instructions which, when executed by the processing circuitry, cause the processing circuitry to: disable h uppermost image lines of the camera sensor; disable h lowermost image lines of the camera sensor; and enable remaining image lines of the camera sensor, wherein h is a positive integer determined based on the future image height and a total number of image lines of the camera sensor.

In Example 10, the subject matter of Examples 8-9 includes, the memory further storing instructions which, when executed by the processing circuitry, cause the processing circuitry to: recursively repeating accessing the feed, determining the future image height, and enabling or disabling the image lines on the sensor.

In Example 11, the subject matter of Examples 8-10 includes, wherein the IMU data comprises angular motion data from a gyroscope.

In Example 12, the subject matter of Examples 8-11 includes, wherein the EIS data comprises at least one of: rotation data, panning data, or tilting data.

In Example 13, the subject matter of Examples 8-12 includes, wherein enabling the image lines on the sensor comprises providing electric power to the image lines on the sensor.

In Example 14, the subject matter of Examples 8-13 includes, wherein disabling the image lines on the sensor comprises failing to provide electric power to the image lines on the sensor.

Example 15 is a machine-readable medium storing instructions that, when executed by processing circuitry, cause the processing circuitry to: access a feed of image frames from a camera; determine, based on at least a first image frame from the feed, a future image height based on electronic image stabilization (EIS) data and internal motion unit (IMU) data; and enable or disable, for at least a second image frame from the feed, image lines on a sensor of the camera to obtain the determined future image height.

In Example 16, the subject matter of Example 15 includes, wherein enabling or disabling the image lines on the sensor of the camera comprises to: disable h uppermost image lines of the camera sensor; disable h lowermost image lines of the camera sensor; and enable remaining image lines of the camera sensor, wherein h is a positive integer determined based on the future image height and a total number of image lines of the camera sensor.

In Example 17, the subject matter of Examples 15-16 includes, storing instructions that, when executed by the processing circuitry, cause the processing circuitry to: recursively repeating accessing the feed, determining the future image height, and enabling or disabling the image lines on the sensor.

In Example 18, the subject matter of Examples 15-17 includes, wherein the IMU data comprises angular motion data from a gyroscope.

In Example 19, the subject matter of Examples 15-18 includes, wherein the EIS data comprises at least one of: rotation data, panning data, or tilting data.

In Example 20, the subject matter of Examples 15-19 includes, wherein enabling the image lines on the sensor comprises providing electric power to the image lines on the sensor.

In Example 21, the subject matter of Examples 15-20 includes, wherein disabling the image lines on the sensor comprises failing to provide electric power to the image lines on the sensor.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:

accessing, by an image signal processor of an image capture device, images from an image sensor of the image capture device;

determining, based on at least a first image from the images, a future image height based on electronic image stabilization (EIS) data and internal motion unit (IMU) data, wherein the IMU data is obtained in accordance with capturing the first image and the EIS data is obtained previous to capturing the first image; and enabling or disabling, for capturing at least a second image from the images, image lines of the image sensor to obtain the determined future image height.

2. The method of claim 1, wherein enabling or disabling the image lines comprises:

disabling a first number of uppermost image lines of the image sensor;

disabling a second number of lowermost image lines of the image sensor; and enabling remaining image lines of the image sensor corresponding to the future image height.

3. The method of claim 2, wherein:

the first number matches as the second number, an image height of the first image is different from the future image height, and an optic horizontal center of the first image matches as an optic horizontal center of the second image; or the first number is different from the second number, an image height of the first image matches as the future image height, and the optic horizontal center of the first image is different from the optic horizontal center of the second image.

4. The method of claim 1, wherein the IMU data comprises angular motion data from a gyroscope of the image capture device.

5. The method of claim 1, wherein the EIS data comprises at least one of: rotation data, panning data, or tilting data.

6. The method of claim 1, wherein enabling the image lines comprises providing power to the image lines.

7. The method of claim 1, wherein disabling the image lines comprises failing to provide power to the image lines on the sensor.

8. An apparatus comprising:

an image sensor, the image sensor comprising image lines;

processing circuitry; and a memory storing instructions which, when executed by the processing circuitry, cause the processing circuitry to:

access images from the image sensor;

determine, based on at least a first image from the images, a future image height based on electronic image stabilization (EIS) data and internal motion unit (IMU) data, wherein the IMU data is obtained in accordance with capturing the first image and the EIS data is obtained previous to capturing the first image; and enable or disable, for capturing at least a second image from the images, at least one of the image lines to obtain the determined future image height.

9. The apparatus of claim 8, wherein the instructions which, when executed by the processing circuitry, cause the processing circuitry to enable or disable the at least one of the image lines comprise instructions which, when executed by the processing circuitry, cause the processing circuitry to:

disable a first number of uppermost image lines of the image sensor;

disable a second number of lowermost image lines of the image sensor; and enable remaining image lines of the image sensor corresponding to the future image height.

10. The apparatus of claim 9, wherein:

the first number matches as the second number, an image height of the first image is different from the future image height, and an optic horizontal center of the first image matches as an optic horizontal center of the second image; or the first number is different from the second number, an image height of the first image matches as the future image height, and the optic horizontal center of the first image is different from the optic horizontal center of the second image.

11. The apparatus of claim 8, wherein the IMU data comprises angular motion data from a gyroscope of the apparatus.

12. The apparatus of claim 8, wherein the EIS data comprises at least one of: rotation data, panning data, or tilting data.

13. The apparatus of claim 8, wherein enabling the image lines comprises providing power to the image lines.

14. The apparatus of claim 8, wherein disabling the image lines comprises failing to provide power to the image lines.

15. A non-transitory machine-readable medium storing instructions that, when executed by processing circuitry of an image capture device, cause the processing circuitry to:

access images from an image sensor of the image capture device;

determine, based on at least a first image from the images, a future image height based on electronic image stabilization (EIS) data and internal motion unit (IMU) data, wherein the IMU data is obtained in accordance with capturing the first image and the EIS data is obtained previous to capturing the first image; and enable or disable, for capturing at least a second image from the images, image lines of the image sensor to obtain the determined future image height.

16. The non-transitory machine-readable medium of claim 15, wherein the instructions that, when executed by the processing circuitry, cause the processing circuitry to enable or disable the at least one of the image lines comprise instructions which, when executed by the processing circuitry, cause the processing circuitry to:

disable a first number of uppermost image lines of the image sensor;

disable a second number of lowermost image lines of the image sensor; and enable remaining image lines of the image sensor corresponding to the future image height.

17. The non-transitory machine-readable medium of claim 16, wherein:

the first number matches as the second number, an image height of the first image is different from the future image height, and an optic horizontal center of the first image matches as an optic horizontal center of the second image; or the first number is different from the second number, an image height of the first image matches as the future image height, and the optic horizontal center of the first image is different from the optic horizontal center of the second image.

18. The non-transitory machine-readable medium of claim 15, wherein the IMU data comprises angular motion data from a gyroscope of the image capture device.

19. The non-transitory machine-readable medium of claim 15, wherein the EIS data comprises at least one of: rotation data, panning data, or tilting data.

20. The non-transitory machine-readable medium of claim 15, wherein enabling the image lines comprises providing power to the image lines.

* * * * *